United States Patent
Tan

(10) Patent No.: US 6,408,099 B2
(45) Date of Patent: *Jun. 18, 2002

(54) METHOD FOR COMPUTATIONAL GRACEFUL DEGRADATION IN AN AUDIOVISUAL COMPRESSION SYSTEM

(75) Inventor: Thiow Keng Tan, Singapore (SG)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/750,706

(22) Filed: Jan. 2, 2001

Related U.S. Application Data

(62) Division of application No. 09/176,104, filed on Oct. 21, 1998.

(30) Foreign Application Priority Data

Oct. 24, 1997 (SG) .......................... 9703861-6

(51) Int. Cl.[7] .............................. G06K 9/36
(52) U.S. Cl. .................. 382/232; 382/233; 382/243; 382/250; 382/251; 382/246
(58) Field of Search ............... 382/244, 243, 382/246, 250, 251, 253, 240, 232, 233; 348/400.1, 401.1, 403.1, 404.1, 406.1, 407.1, 408.1, 409.1, 410.1, 411.1, 412.1, 413.1, 414.1, 415.1, 416.1, 417.1, 418.1, 419.1, 420.1, 421.1, 422.1, 430.1, 431.1; 340/345, 146.3; 358/260, 133, 261

(56) References Cited

U.S. PATENT DOCUMENTS

| | | | |
|---|---|---|---|
| 5,128,756 A | * 7/1992 | Johnston et al. | 375/240.12 |
| 5,402,146 A | 3/1995 | Rodriguez et al. | |
| 5,434,913 A | * 7/1995 | Tung et al. | 379/202.01 |
| 5,461,679 A | * 10/1995 | Normile et al. | 382/304 |
| 5,500,673 A | 3/1996 | Zhou | |
| 5,537,551 A | * 7/1996 | Denenberg et al. | 709/247 |
| 5,548,322 A | 8/1996 | Zhou | |
| 5,596,362 A | 1/1997 | Zhou | |
| 5,852,669 A | 12/1998 | Eleftheriadis et al. | |
| 5,946,040 A | 8/1999 | Kato et al. | |
| 5,978,514 A | 11/1999 | Yamaguchi et al. | |
| 6,005,980 A | * 12/1999 | Eifrig et al. | 382/236 |
| 6,026,088 A | 2/2000 | Rostoker et al. | |
| 6,072,830 A | * 6/2000 | Proctor et al. | 375/240.22 |
| 6,137,837 A1 | * 2/2001 | Nemiroff et al. | 375/240.16 |
| 6,188,792 B1 | * 2/2001 | Chujoh et al. | 382/236 |

FOREIGN PATENT DOCUMENTS

| | | |
|---|---|---|
| EP | 676899 | 3/1995 |
| EP | 650298 | 4/1995 |
| EP | 677961 | 10/1995 |
| EP | 739141 | 10/1996 |
| WO | 99/12126 | 3/1999 |

* cited by examiner

Primary Examiner—Phuoc Tran
Assistant Examiner—Ali Bayat
(74) Attorney, Agent, or Firm—Greenblum & Bernstein, P.L.C.

(57) ABSTRACT

The invention disclosed here is a method for an encoder to encode audiovisual information for transmission to the decoder without any prior knowledge of the computational capabilities of the decoder. A descriptor containing parameters that can be used to estimate the complexity of the decoding process is embedded in the system stream. The encoder also encodes the video information in such a manner that the decoder can choose to ignore some of the information and only decode a subset of the encoded information in order to reduce the computational requirements. This method allows more than one decoder to decode the same bitstream giving different resolutions depending on the computational capability of the decoder.

2 Claims, 6 Drawing Sheets

METHOD FOR COMPUTATIONAL GRACEFUL DEGRADATION IN AN AUDIOVISUAL COMPRESSION SYSTEM

This application is a divisional of application Ser. No. 09/176,104, filed Oct. 21, 1998, the entire disclosure of which is expressly incorporated by reference herein it its entirety.

BACKGROUND OF THE INVENTION

1. Field of the Invention

The present invention relates to a method for computational graceful degradation in an audiovisual compression system. This invention is useful in a multimedia encoding and decoding environment where the computational demands for decoding a bitstream is not well defined. It is also useful in cases where channel capacity is limited and some form of quality of service guarantee is required. It is also useful for inter working between two video services of different resolutions.

2. Description of the Related Art

It is common in the case of software decoding to employ some form of graceful degradation when the system resources is not sufficient to fully decode all of the video bitstream. These degradation ranges from partial decoding of the picture elements to dropping of complete pictures. This is easy to implement in the case of a single video stream.

In the proposed new ISO/IEC SC29/WG11 standard of MPEG-4, it is possible to send multiple Audiovisual, AV, objects. Therefore, the total complexity requirements no longer depend on one single stream but on multiple streams.

In compression systems such as MPEG-1, MPEG-2 and MPEG-4, a high degree of temporal redundancy is removed by employing motion compensation. It is intuitive to see that successive pictures in a video sequence will contain very similar information. Only regions of the picture that are moving will change from picture to picture. Furthermore, these regions usually move as a unit with uniform motion. Motion compensation is a technique where the encoder and the decoder keep the reconstructed picture as a reference for the prediction of the current picture being encoded or decoded. The encoder mimics the decoder by implementing a local decoder loop. Thus, keeping the reconstructed picture synchronized between the encoder and decoder.

The encoder performs a search for a block in the reconstructed picture that gives the closest match to the current block that is being encoded. It then computes the prediction difference between the motion compensated block and the current block being encoded. Since the motion compensated block is available in the encoder and the decoder, the encoder only needs to send the location of this block and the prediction difference to the decoder. The location of the block is commonly referred to as the motion vector. The prediction difference is commonly referred to as the motion compensated prediction error. These information requires less bits to send that the current block itself.

In intra-picture coding, spatial redundancy may be removed in a similar way. The transform coefficients of the block can be predicted from the transform prediction of its neighboring blocks that have already being decoded.

There are two major problems to be solved in this invention. The first is how to indicate the decoding complexity requirements of the current AV object. In the case where there are multiple AV objects, the systems decoder must decide how much resource should be given to a particular object and which object should have priority over another. In other words, how to model the complexity requirements of the system. A point to be noted here is that the complexity requirements of the decoder is dependent on the implementation of the decoder. An operation that is complex for one implementation may be simple for another implementation. Therefore, some form of implementation independent complexity measure is required.

The second problem is how to reduce complexity requirements in the decoder. This deals with the method of reducing the complexity requirements of the decoding process while retaining as much of the information as possible. One biggest problem in graceful degradation is the problem of drift caused by errors in the motion compensation. When graceful degradation is employed the reconstructed picture is incomplete or noisy. These errors are propagated from picture to picture resulting in larger and larger errors. This noise propagation is referred to as drift.

SUMMARY OF THE INVENTION

In order to solve the problems the following steps are taken in the present invention.

The AV object encoder encodes the AV object in a manner that would allow different amounts of graceful degradation to be employed in the AV object decoder. Parameters relating to the computational complexity requirements of the AV objects are transmitted in the systems encoder. Implementation independent complexity measure is achieved by sending parameters that gives an indication of the operations that are required.

At the systems decoder, estimates of the complexity required are made based on these parameters as well as the implementation methods being employed. The resource scheduler then allocates the appropriate amount of resources to the decoding of the different AV objects. In the AV object decoder, computational graceful degradation is employed when the resources are not sufficient to decode the AV object completely.

In accordance with a first aspect of the present invention, a method of encoding a plurality of audiovisual objects into a compressed coded representation suitable for computational graceful degradation at the decoder comprises:

encoding said audiovisual objects, incorporation methods allowing computational graceful degradation to be employed in the decoder, into their coded representations;

estimating the implementation independent computational complexity measures in terms of a plurality of block decoding parameters;

partitioning said coded representations of the audiovisual objects into a plurality of access units and adding header information to form packets;

inserting a descriptor containing said block decoding parameters into the header of the packet; and multiplexing these packets to form a single multiplexed bitstream.

In accordance with a second aspect of the present invention, a method of decoding a multiplexed bitstream, with computational graceful degradation, to obtained a plurality of audiovisual objects, comprises:

de-multiplexing the single multiplexed bitstream into a plurality of packets comprising of packet headers and access units;

extracting the descriptor containing a plurality of block decoding parameters from the packet headers;

reassembling the access units into their original coded representations of the audiovisual objects;

estimating the decoder specific computational complexity measures based on said block decoding parameters and the current decoder implementation; and decoding said coded representations of the audiovisual objects, using computational graceful degradation, where necessary, to satisfy the estimated decoder specific computational complexity requirements.

Preferably, the incorporation methods allowing computational graceful degradation to be employed in the decoder, comprise:

partitioning the input pictures to be encoded into a plurality of sub-regions numbered in increasing order, beginning with the full picture as the first sub-region, where each sub-region comprising only of a subset of the pixels within the sub-region preceding it;

entropy coding the position and dimension of the sub-regions into a compressed coded representation within the bitstream;

further partitioning the sub-regions into a plurality of blocks for encoding into a compressed coded representation within the bitstream;

performing motion estimation and motion compensation for said blocks using only the pixels from the reconstructed picture that belong to sub-regions having the same or higher numeric order as said blocks;

entropy coding the motion vectors into a compressed coded representation within the bitstream;

transforming the motion compensated prediction difference into an orthogonal domain;

quantizing the transformed coefficients using a quantization method; and, entropy coding the quantized transformed coefficients into a compressed coded representation within the bitstream.

Preferably, the method for decoding the coded representations of the audiovisual objects in accordance with the second aspect, using computational graceful degradation where necessary to satisfy the estimated decoder specific computational complexity requirements, further comprises:

entropy decoding the position and dimension of the sub-regions from the compressed coded representation within the bitstream;

selecting only the blocks that are within the sub-region of interest for decoding;

entropy decoding the compressed coded representation to give quantized transformed coefficients;

inverse quantizing said quantized transformed coefficients to give the transformed coefficients;

inverse transforming said transform coefficients to give the spatial domain motion compensated prediction difference;

entropy decoding the motion vectors from the compressed coded representation within the bitstream;

performing motion compensation for said blocks using only the pixels from the reconstructed picture that belong to sub-regions having the same or higher numeric order as said blocks; and, reconstructing the picture and storing said picture in the frame memory for prediction of the next picture.

Preferably, the method in accordance with the first aspect of the invention, whereby incorporation methods allowing computational graceful degradation to be employed in the decoder, further comprises:

partitioning the input pictures to be encoded into a plurality of sub-regions numbered in increasing order, beginning with the full picture as the first sub-region, where each sub-region comprising only of a subset of the pixels within the sub-region preceding it;

entropy coding the position and dimension of the sub-regions into a compressed coded representation within the bitstream;

further partitioning the sub-regions into a plurality of blocks for encoding into a compressed coded representation within the bitstream;

transforming said blocks into an orthogonal domain;

quantizing the transformed coefficients using a quantization method;

performing quantized transform coefficient prediction for said blocks using only the corresponding quantized transform coefficients from the blocks above and to the left that belong to sub-regions having the same or higher numeric order as said blocks; and, entropy coding the predicted difference of the quantized transformed coefficients into a compressed coded representation within the bitstream.

Preferably, the method in accordance with the first aspect of the invention, comprises:

entropy decoding the position and dimension of the sub-regions from the compressed coded representation within the bitstream;

selecting only the blocks that are within the sub-region of interest for decoding;

entropy decoding the compressed coded representation to give quantized transformed coefficients;

performing quantized transform coefficient prediction for said blocks using only the corresponding quantized transform coefficients from the blocks above and to the left that belong to sub-regions having the same or higher numeric order as said blocks;

inverse quantizing said quantized transformed coefficients to give the transformed coefficients;

inverse transforming said transform coefficients to give the spatial domain pixel values; and, reconstructing the picture and storing said picture in the frame memory for prediction of the next picture.

Typically, the plurality of block decoding parameters comprises numeric numbers indicating the number of:

block entropy decoding operations;

block motion compensation operation;

block inverse quantization operations;

block transform operations;

block addition operations; and, block memory access operations.

Preferably, the descriptor comprises:

a descriptor identification number signaling the descriptor type;

a descriptor length field to indicate the size of the descriptor; and, a plurality of block decoding parameters.

Typically, in the method of partitioning the input pictures to be encoded into a plurality of sub-regions, the sub-regions are rectangular.

Preferably, in the method of performing motion estimation and motion compensation for said blocks, using only the pixels from the reconstructed picture that belong to sub-regions having the same or higher numeric order as said blocks, implies that only prediction blocks that lie completely within said sub-regions are selected.

Typically, when only the pixels from the reconstructed picture that belong to sub-regions having the same or higher numeric order as said blocks are used, prediction blocks may lie partially outside said sub-regions but with the additional condition that the pixels lying outside said sub-region are replaced by the nearest pixels from within the sub-regions.

Preferably, in the method of partitioning the pictures into a plurality of sub-regions, the position and dimension of each of said sub-regions may vary from picture to picture and said position and said dimension are coded by means of a pan scan vector, giving the horizontal and vertical displacement, a width and a height.

Typically, in the method of partitioning the pictures into a plurality of sub-regions, the position and dimension of the sub regions are the same from picture to picture and said position and said dimension are coded once at the beginning of the sequence by means of a horizontal and vertical displacement, a width and a height.

Preferably, in the method of encoding and decoding, the transform is the Discrete Cosine Transform.

Typically; in the method of encoding and decoding, the number of sub-regions is two.

Preferably, in the method where there is a plurality of sub-region numbered in increasing order and the motion vector can point into a sub-region of lower order but not out of a lower order to a higher ordered number.

DESCRIPTION OF THE PREFERRED EMBODIMENTS

Figure 1:
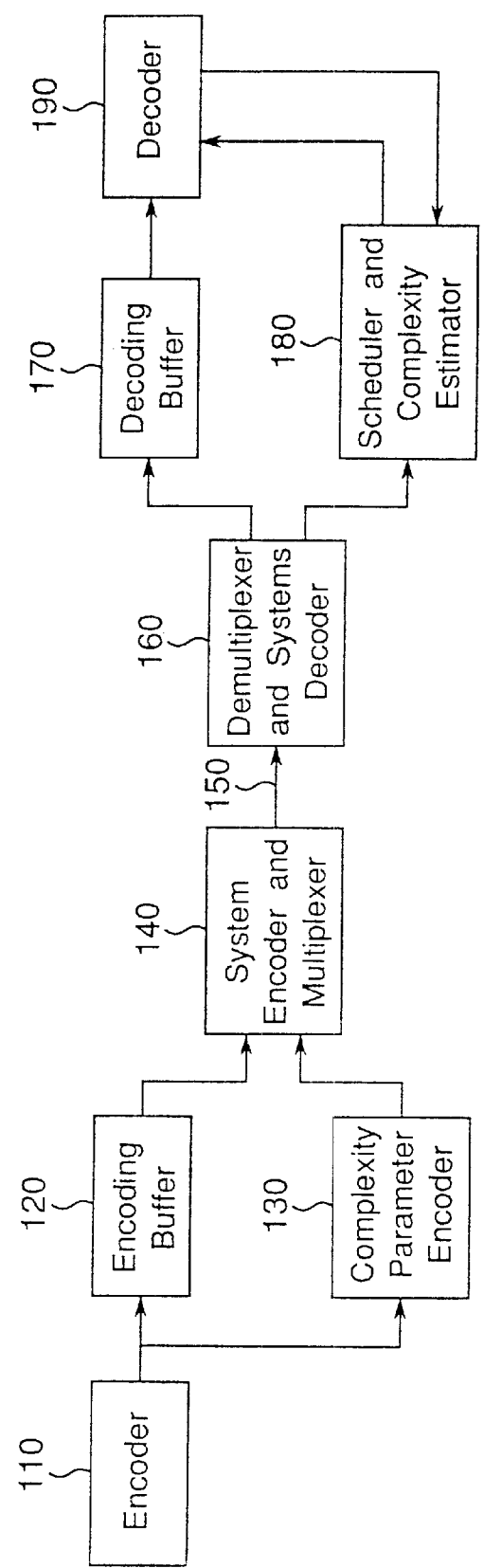
FIG. 1 is an overall block diagram of the present invention.

FIG. 1 shows an overall system block diagram of the present invention. Encoder unit 110 encodes the video sequence to allow computational graceful degradation techniques. The output of encoder 110 is a coded representation of the video sequence that is applied to an encoding buffer 120. At the same time the video sequence and the coded representation are also applied to a complexity parameter encoder 130 where the parameters associated with the operation that are required for decoding is computed and encoded. These information together with the output of the encoding buffer 120 are passed to a System Encoder and Multiplexer unit 140 where a system-multiplexed stream is formed. The system-multiplexed stream is transmitted through a transmission media 150.

A Demultiplexer and System Decoder unit 160 receives the system-multiplexed stream, where the bitstream is demultiplexed into its respective elementary streams. The video elementary stream is passed to a Decoding Buffer 170, and complexity parameters are passed to a Scheduler and Complexity Estimator unit 180. From the-Decoding Buffer 170, the video elementary stream is passed to a Decoder unit 190. The decoder 190 waits for the commands coming from the Scheduler unit 180 before decoding.

The Complexity Estimator 180 gives the amount of decoder computational graceful degradation that is to be employed. Computational graceful degradation is achieved in the decoder by decoding only a sub-region of the complete picture that is deemed to contain the more important information. The encoder will have to prevent the encoder and decoder from drifting apart under these conditions. After decoding, the decoder unit 190 also feedback information to the Scheduler and Complexity Estimator 180 so that the information may be used to estimate the complexity of the next picture.

The following is the embodiment of the various units illustrated in the above invention shown in FIG. 1.

Figure 2:
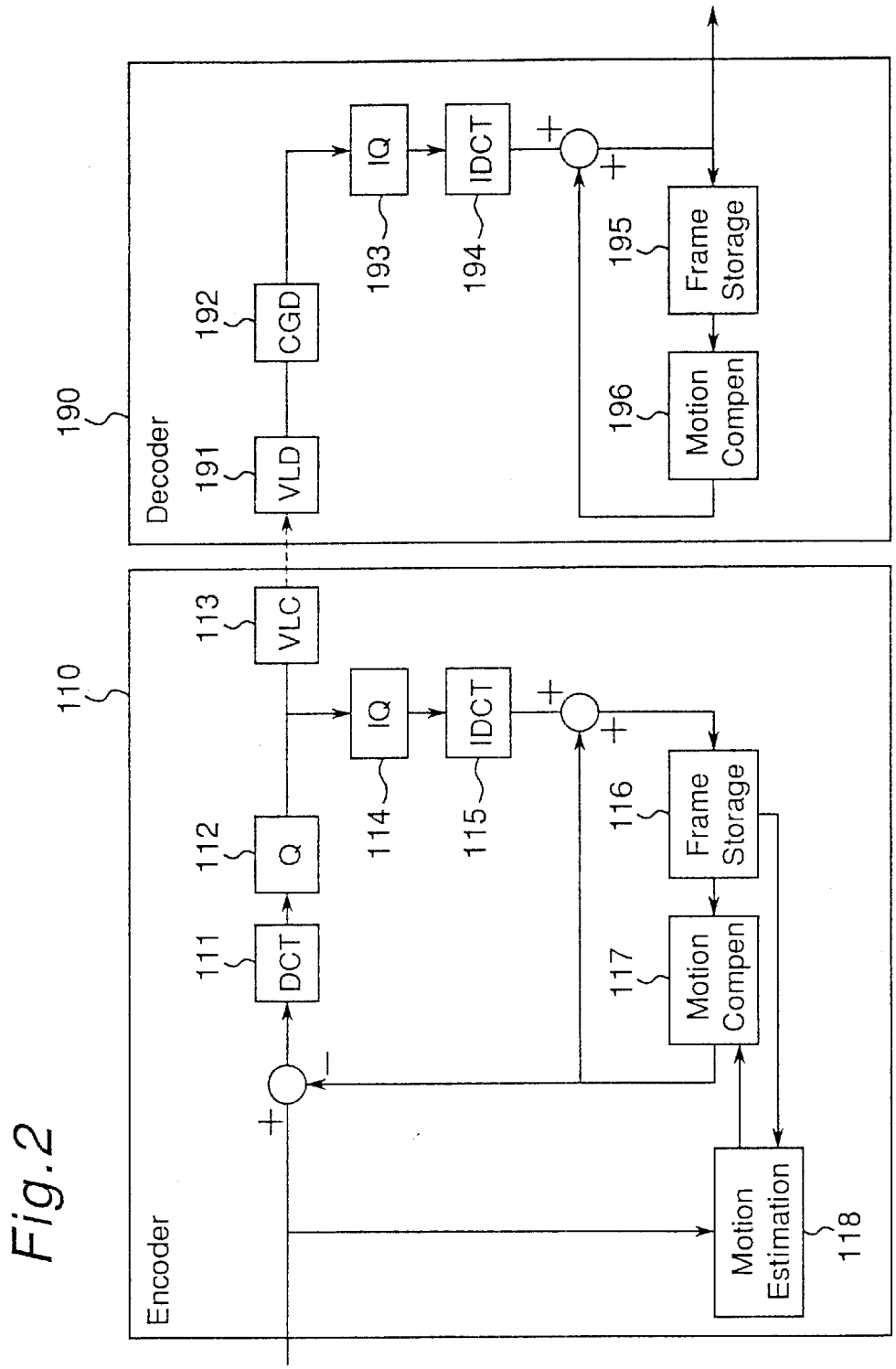
FIG. 2 shows a block diagram of encoder and decoder of the present invention.

FIG. 2 is a block diagram of the encoder and decoder according to the present embodiment. The input picture to the encoder 110 is segmented into blocks for processing. Temporal redundancy is removed from the picture by subtracting the motion compensated picture of the previous picture from the current picture. The prediction difference is then transformed into the DCT domain in a DCT unit 111. The resulting DCT coefficients are then quantized in a Quantization unit 112. The quantized coefficients are then entropy coded in a Variable Length Coding (VLC) unit 113 to form the compressed output bitstream. The encoder 110 also has a local decoder loop comprising of an Inverse Quantization unit 114, an Inverse DCT unit 115, a Frame Storage 116, and a Motion Compensation unit 117. The local decoder loops mimics the decoder operations by inverse quantizing the coefficients and transforming it back into the spatial domain in the Inverse Quantization unit 114 and Inverse DCT unit 115. The output is then added to the output of the Motion Compensated unit 117 to form the reconstructed picture. This picture is stored in the Frame Storage 116 for motion compensation of the next picture.

In this embodiment the encoder units of Motion Estimation unit 118 and Motion Compensation unit 117 are changed so that computational graceful degradation may be performed in conjunction with the motion compensation without causing drift.

Figure 3:
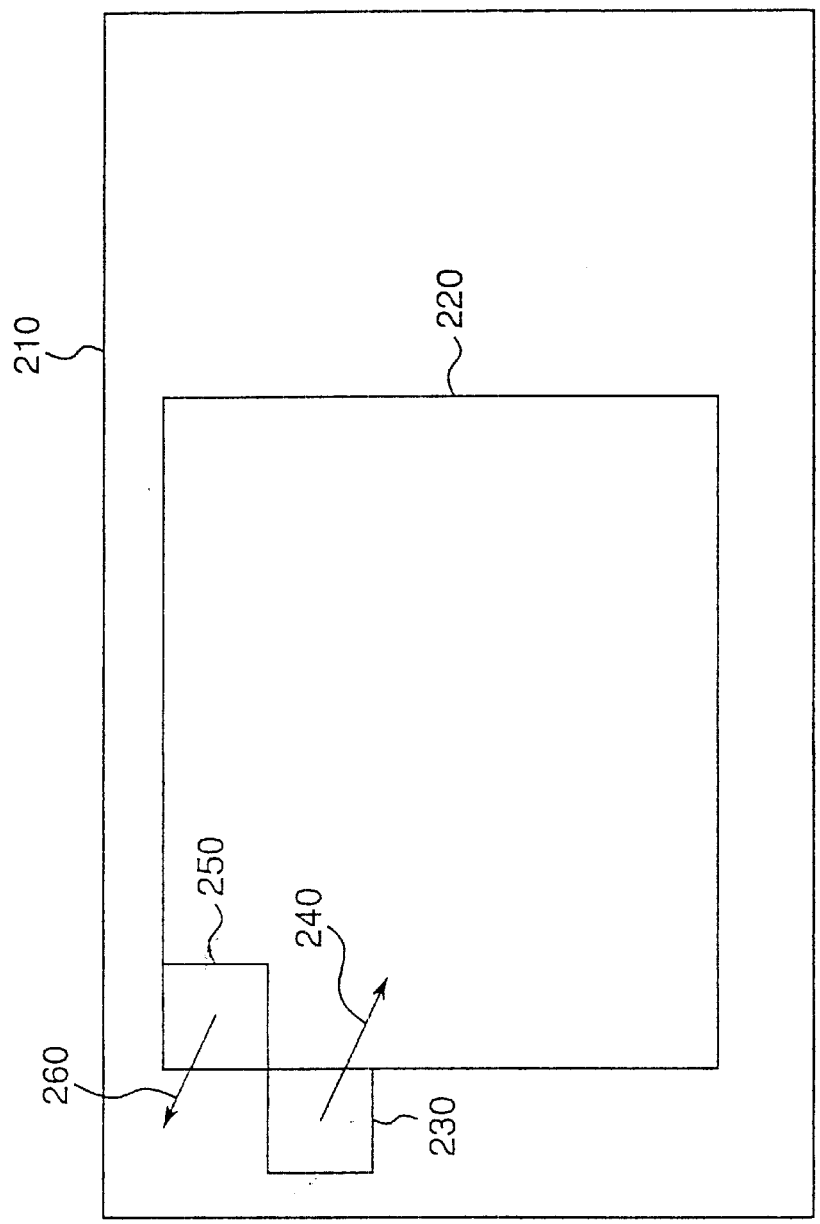
FIG. 3 illustrates the embodiment of the sub-region and the motion vector restriction of the present invention.

FIG. 3 illustrates the present invention, according to which the picture is divided into two parts 220 and 210. The first part 220 is a sub-region that must be decoded in the decoder regardless of whether computational graceful degradation is employed or not. The second part 210 is the region outside of the sub-region, which may be discarded by the decoder when computational graceful degradation is employed.

FIG. 3 also show two blocks that are used for motion compensation. When motion compensation is performed on a block 250 that resides in the sub-region 220, the motion compensated prediction block must also come from within the sub-region 220 of the reference picture. In other words the motion vector 260 pointing out of the region is not allowed. This is referred to restricted motion vector. On the other hand, when a block 230 resides outside the sub-region 220, the motion compensated prediction block can come from anywhere in the reference picture. This is the same as where there is no sub-region.

Figure 4:
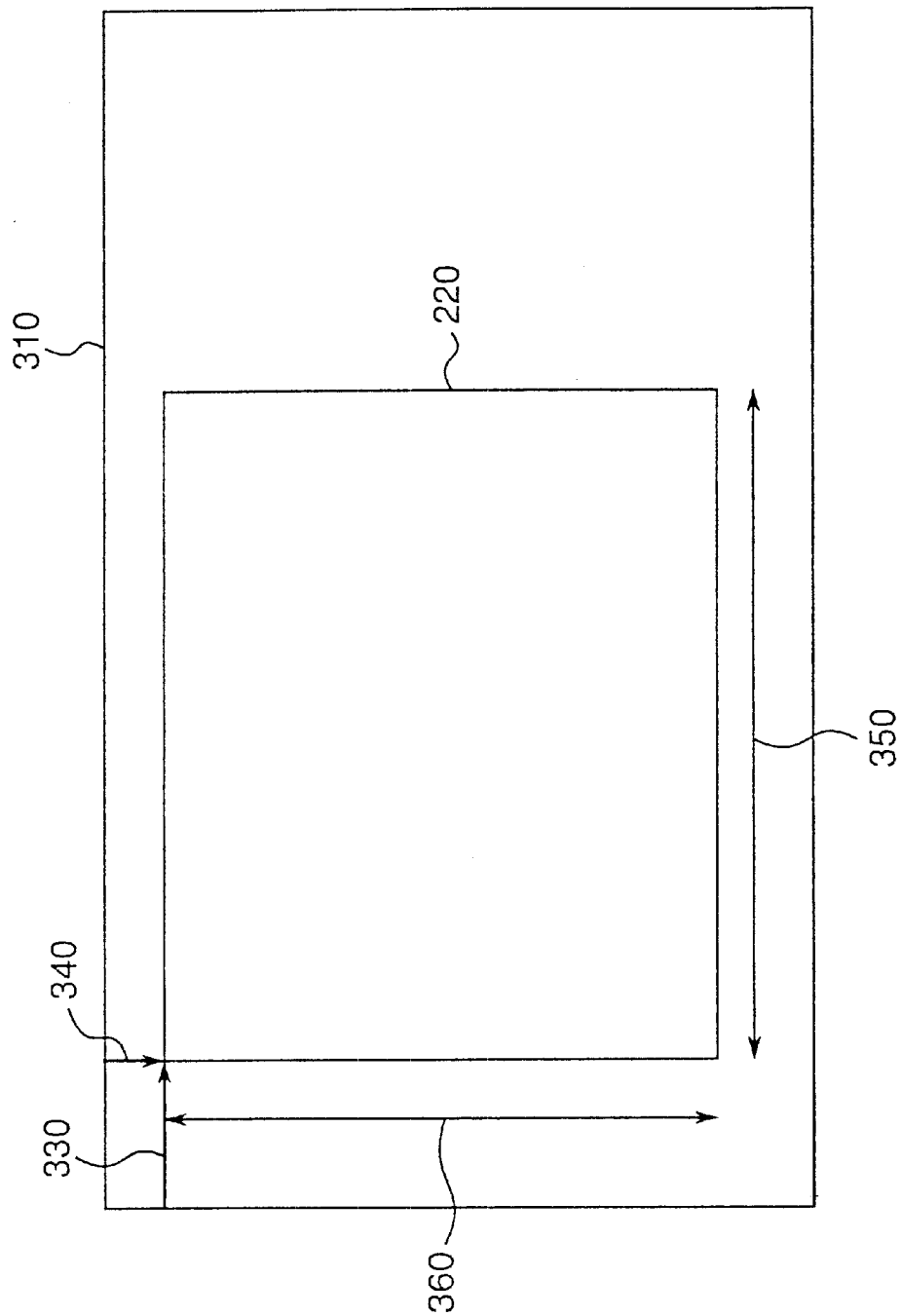
FIG. 4 illustrates the embodiment for the pan-scan vectors and the sub-region dimensions in the present invention.

FIG. 4 shows a method how to indicate the sub-region 220 within each picture. In order to specify the rectangular sub-region 220 for each picture the following parameters must be specified for each picture and be encoded in the picture header of the compress bitstream. In FIG. 4, a picture 310 and the sub-region 220 is illustrated. The horizontal offset 330 of the left edge of sub-region 220 from the left edge of the picture, and the vertical offset 340 of the top edge of the sub-region 220 from the top edge of the picture are shown. These two parameters, referred to as the pan scan vectors, are used to indicate the location of the sub-region. The width 350 and the height 360 of the sub-region 220 are the second set of parameters that are required to specify the dimensions of the sub-region 220.

Figure 5:
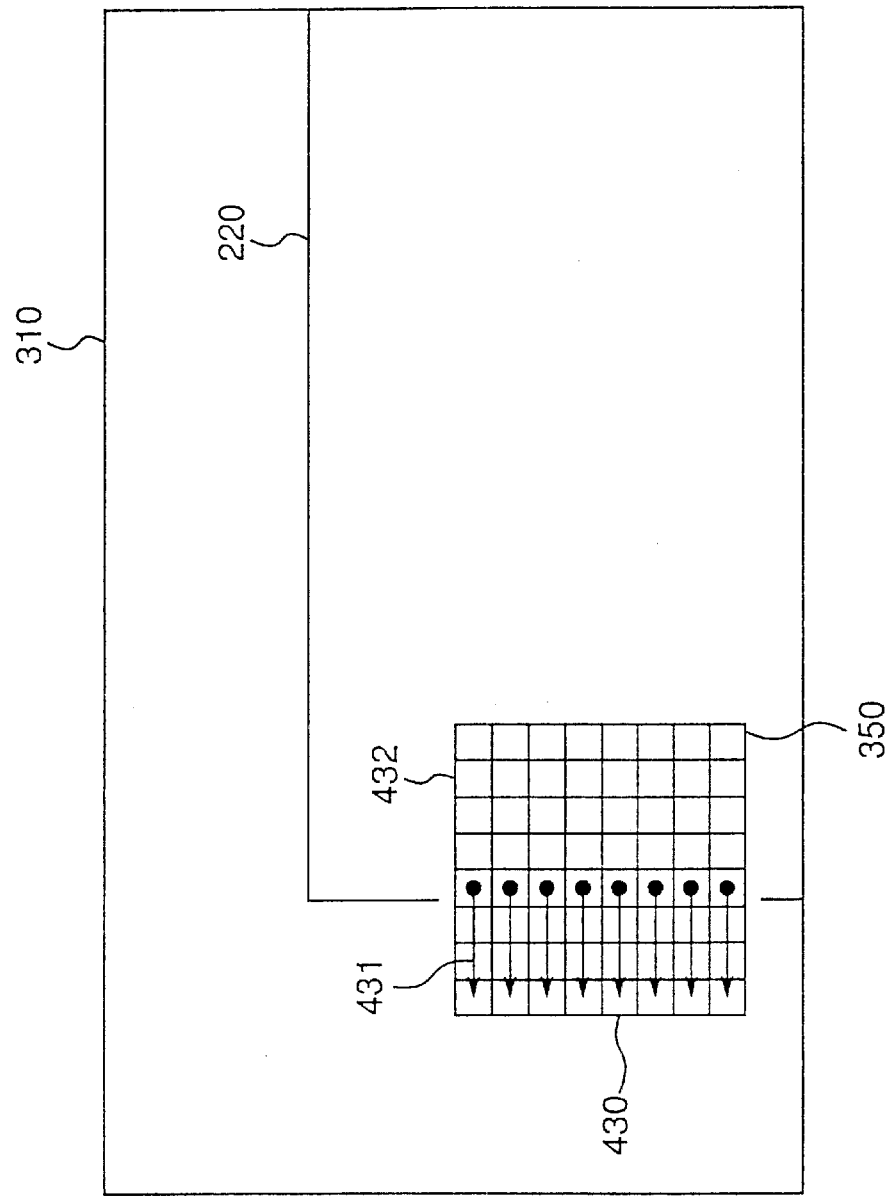
FIG. 5 illustrates the second embodiment for the padding method of the motion compensated prediction at the sub-region boundary; and, FIG. 6 illustrates the block diagram for the Complexity Estimator.

In a second embodiment of this invention, the motion vector for a block in the sub-region need not be restricted. It is allowed to point out of the sub-region of the reference picture. However padding is required. This is illustrated in FIG. 5 in which the picture 310 and the sub-region 220 are shown. The motion compensated prediction 430 is shown straddling the boundary of the sub-region 220. A portion 431 of the block residing outside of the sub-region 220 is not used for prediction and is padded by repeating the value of the pixel found at the edge of the sub-region 220. A portion 432 of the block residing in the sub-region 220 is used without any padding. A similar padding method is used for the rows and columns for blocks located at the vertical edge and horizontal edge, respectively.

Like the first embodiment, the method according to the second embodiment would also enable computational graceful degradation method to discard the portion of the picture outside the sub-region 220 without causing the encoder and decoder to drift apart.

Apart from motion compensation that may cause drift in inter blocks, intra blocks at the top and left boundary of the sub-region 220 are also restricted from using any blocks outside of the sub-region 220 for prediction. This is because in the computational graceful degraded decoder, these blocks would not be decoded and thus the prediction cannot be duplicated. This precludes the commonly used DC and AC coefficient prediction from being employed in the encoder.

FIG. 2 also illustrates a block diagram of a decoder 190. The embodiment of the decoder 190 employing computational graceful degradation is described here. The compressed bitstream is received from the transmission and is passed to a Variable Length Decoder unit 191 where the bitstream is decoded according to the syntax and entropy method used. The decoded information is then passed to the Computational Graceful Degradation Selector 192 where the decoded information belonging to the sub-region 220 is retained and the decoded information outside of the sub-region 220 is discarded. The retained information is then passed to an Inverse Quantization unit 193 where the DCT coefficients are recovered. The recovered coefficients are then passed to an Inverse DCT unit 194 where the coefficients are transformed back to the spatial domain. The motion compensated prediction is then added to form the reconstructed picture. The reconstructed picture is stored in a Frame Storage 195 where it is used for the prediction of the next picture. A Motion compensation unit 196 performs the motion compensation according to the same method employed in the encoder 110.

In the first embodiment of the encoder where the motion vector is restricted, no additional modification is required in the decoder. In the second embodiment of the encoder where the motion vector is not restricted, the motion compensation method with padding described above in connection with FIG. 5 is used in the decoder. Finally, intra blocks at the top and left boundary of the sub-region 220 are also restricted from using any blocks outside of the sub-region 200 for prediction. This precludes,the commonly used DC and AC coefficient prediction from being employed.

In this embodiment the Complexity Parameter Encoder consist of a counting unit that counts the number of block decoding operations that are required. The block decoding operations are not basic arithmetic operations but rather a collection of operations that are performed on a block. A block decoding operation can be a block inverse quantization operation, a block inverse DCT operation, a block memory access or some other collection of operations that perform some decoding task on the block by block basis. The Complexity Parameter Encoder counts the number of blocks that require each set of operations and indicate these in the parameters. The reason block decoding operations are used instead of simple arithmetic operations is because different implementations may implement different operations more efficiently than others.

There is also a difference in decoder architecture and different amounts of hardware and software solutions that makes the use of raw processing power and memory access measures unreliable to indicate the complexity requirements. However, if the operations required are indicated by parameters that counts the number of block decoding operations necessary, the decoder can estimate the complexity. This is because the decoder knows the amount of operations required for each of the block decoding operations in its own implementation.

In the embodiment of the System Encoder and Multiplexer, the elementary bitstream are packetized and multiplexed for transmission. The information associated with the complexity parameters is also multiplexed into the bitstream. This information is inserted into the header of the packets. Decoders that do not require such information may simply skip over this information. Decoders that require such information can decode this information and interpret them to estimate the complexity requirements.

In this embodiment the encoder inserts the information in the form of a descriptor in the header of the packet. The descriptor contains an ID to indicate the type of descriptor it is followed by the total number of bytes contained in the descriptor. The rest of the descriptor contains the parameter for each of the block decoding operations. Optionally the descriptor may also carry some user defined parameters that are not defined earlier.

In the Scheduler and Complexity Estimator 180 in FIG. 1, the time it takes for decoding all the audiovisual objects is computed based on the parameters found in the descriptor as well as the feedback information from the decoder.

Figure 6:
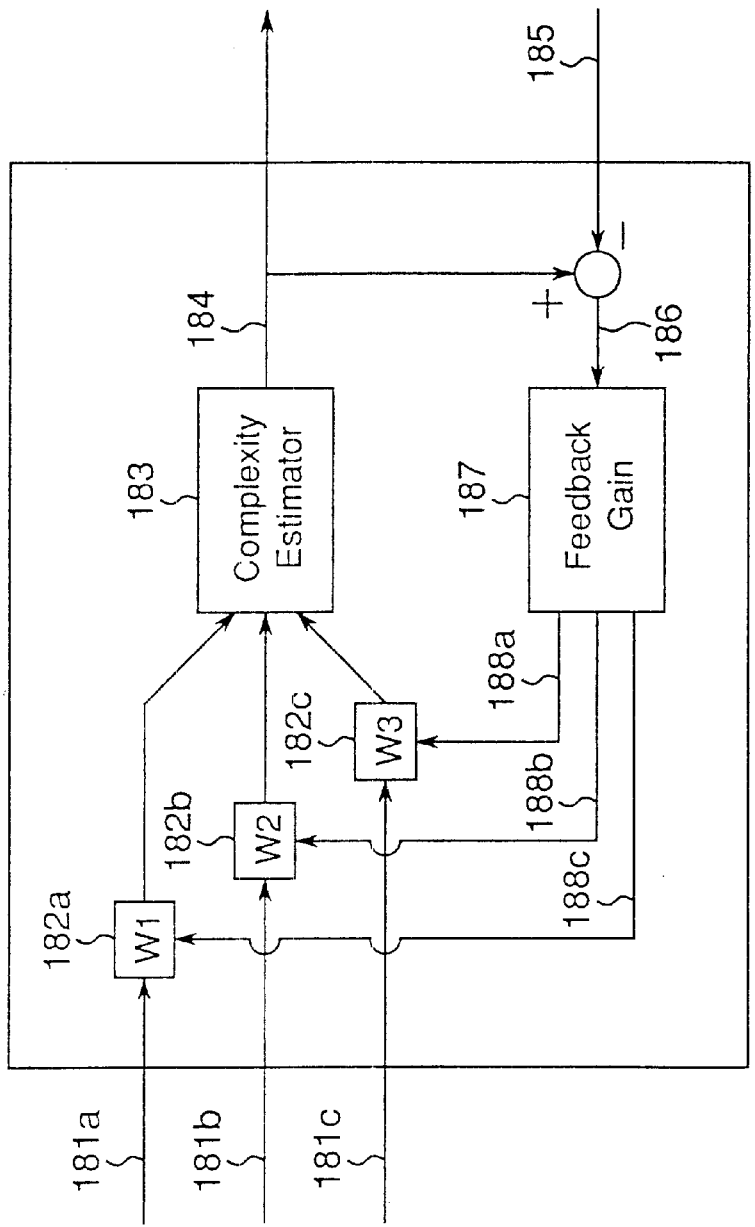

An embodiment of the Complexity Estimator 180 is shown in FIG. 6. The block decoding operation parameters 181a, 181b and 181c are passed into the complexity estimator 183 after being pre-multiplied with weightings 182a, 182b and 182c, respectively. The complexity estimator 183 then estimates the complexity of the picture to be decoder and passes the estimated complexity 184 to the decoder 190. After decoding the picture the decoder 190 returns the actual complexity 185 of the picture. An error 186 in the complexity estimation is obtained by taking a difference between the estimated complexity 184 and the actual complexity 185 of the picture. The error 186 is then passed into the feedback gain unit 187 where the corrections 188a, 188b and 188c to the weightings are found. The weights are then modified by these corrections and the process of estimating the complexity of the next picture continues.

The effect of this invention is that the need for implementations that can handle the worst case is no longer necessary. Using the indications of computational complexities and the computational graceful degradation methods simpler decoders can be implemented. The decoder would have the capabilities to decode most of the sequences, but if it encounters some more demanding sequences, it can degrade the quality and resolution of the decoder output in order to decode the bitstream.

This invention is also useful for inter working of services that have different resolutions and/or different formats. The sub-region can be decoder by the decoder of lower resolutions where as the decoder of higher resolutions can decode the full picture. One example is the inter working between 16:9 and 4:3 aspect ratio decoders.

I claim:

1. A method for encoding a visual object, comprising:

encoding a visual object to obtain compressed coded data, wherein the compressed coded data is obtained through at least one of a plurality of different operations which can be performed on a block by block basis;

generating a descriptor capable of including information of a respective parameter related to the number of times that each of said operations was performed in a unit of blocks, said descriptor associated with a complexity of decoding the compressed coded data; and multiplexing the descriptor with the compressed coded data;

wherein the operations include at least one of:
   a block entropy encoding operation;
   a block motion compensation operation;
   a block quantization operation; and
   a block transforming operation.

2. A method for encoding a visual object having a plurality of pictures, comprising:

encoding a visual object to obtain compressed coded data, wherein the compressed coded data is obtained through segmenting each picture in a plurality of blocks and through performing at least one of a plurality of different operations on a block by block basis;

generating a descriptor related to the number of times that each of said operations was performed during encoding said picture, said descriptor associated with a complexity of decoding the compressed coded data; and multiplexing the descriptor with the compressed coded data;

wherein the operations include at least one of:
   a block entropy encoding operation;
   a block motion compensation operation;
   a block quantization operation; and
   a block transforming operation.

* * * * *